US006798484B2

(12) United States Patent
Yang et al.

(10) Patent No.: US 6,798,484 B2
(45) Date of Patent: Sep. 28, 2004

(54) TWO-DOMAIN IN-PLANE SWITCHING MODE LCD

(75) Inventors: Kie-Hsiung Yang, Taoyuan Hsien (TW); Sheng-Hsien Lin, Tainan Hsien (TW)

(73) Assignee: Hannstar Display Corp., Taipei (TW)

(*) Notice: Subject to any disclaimer, the term of this patent is extended or adjusted under 35 U.S.C. 154(b) by 0 days.

(21) Appl. No.: 10/245,389

(22) Filed: Sep. 18, 2002

(65) Prior Publication Data

US 2003/0107697 A1 Jun. 12, 2003

(30) Foreign Application Priority Data

Dec. 12, 2001 (TW) ....................................... 90130794 A

(51) Int. Cl.[7] ............................................. G02F 1/1343
(52) U.S. Cl. ....................................................... 349/141
(58) Field of Search .......................................... 349/141

(56) References Cited

U.S. PATENT DOCUMENTS 6,266,116 B1 * 7/2001 Ohta et al. .................. 349/141
6,342,937 B2 * 1/2002 Hiroshi ....................... 349/141
6,525,798 B1 * 2/2003 Yamakita et al. ........... 349/141

* cited by examiner

*Primary Examiner*—Robert H. Kim
*Assistant Examiner*—Jeanne Andrea Di Grazio
(74) *Attorney, Agent, or Firm*—Rabin & Berdo, P.C.

(57) ABSTRACT

An in-plane switching mode liquid crystal display (IPS-LCD). A plurality of lengthwise-extending common electrodes are formed in each pixel area, and each common electrode has a curved or zigzag profile. A plurality of lengthwise-extending pixel electrodes are formed in each pixel area, and each pixel electrode has a curved or zigzag profile. The pixel electrodes are disposed in the intervals between the common electrodes, and two adjacent pixel and common electrodes form a subpixel area. Liquid crystal molecules are positioned within each sub-pixel area. The two adjacent pixel electrode and common electrodes within each sub-pixel area are not parallel to each other, and thus a gradient in-plane electric field is generated therebetween.

20 Claims, 4 Drawing Sheets

TWO-DOMAIN IN-PLANE SWITCHING MODE LCD

BACKGROUND OF THE INVENTION

1. Field of the Invention

The present invention relates to a two-domain in-plane switching mode liquid crystal display (IPS-LCD) and, more particularly, to an electrode array of the IPS-LCD to generate a gradient electric field between a pixel electrode and a common electrode.

2. Description of the Related Art

In-Plane Switching mode liquid crystal display (IPS-LCD) has been used or suggested in wide view angle display technology to improve a conventional twisted nematic (TN)-LCD. The IPS-LCD has common electrodes and pixel electrodes formed on a lower glass substrate (TFT substrate) and an in-plane electrode field therebetween is generated to rearrange the LC molecules along the electrode field. Accordingly, the IPS-LCD device can improve viewing angle, contrast ratio and color shift over the conventional twisted nematic device.

Depending on the electrode array of the common electrodes and the pixel electrodes, the IPS-LCD is classified into a single-domain type and a two-domain type. FIG. 1 is a top view showing an electrode array of a conventional single-domain IPS-LCD 10. Two parallel gate lines 2 are orthogonal to two parallel data lines 4 to define a rectangular-shaped pixel area, in which a TFT device 5, a comb-shaped pixel electrode 6 and a herringbone-shaped common electrode 8 are formed. The center wiring 8*a* of the common electrode 8 transversely extends along the center of the pixel area, and the bones 8*b* of the common electrode 8 lengthwise extend form the center wiring 8*a*. The teeth 6*a* of the pixel electrode 6 are disposed in the intervals of the bones 8*b*. When an outer voltage is applied to the IPS-LCD, an in-plane electric field is generated between the adjacent bone 8*b* and tooth 6*a*.

The strip-shaped teeth 6*a* are parallel to the strip-shaped bones 8*b*, thus the in-plane electric field generated between the adjacent bone 8*b* and tooth 6*a* is uniform. The uniform electric field indicates that the differential (or gradient) of the strength (including direction) of the electric field at each point to the corresponding planar space is zero. This can make LC molecules have a uniform driving state at the same time, but this needs a higher driving voltage. A way to solve this problem is to reduce the distance between the adjacent bone 8*b* and tooth 6*a* by increasing the number of the teeth 6*a* and the bones 8*b* in the pixel area to lower the driving voltage of the IPS-LCD 10. However, the line width of the teeth 6*a* and bones 8*b* cannot be narrower than about 3 to 4 microns, thus the aperture ratio of the pixel area is decreasing as the number of the teeth 6*a* and the bones 8*b* is increasing. The single-domain IPS-LCD 10 with the above-described array design of a uniform electric field cannot simultaneously give consideration to the requirements of high aperture ratio and low driving voltage.

A two-domain IPS-LCD is developed for solving a problem of color shift of the single-domain IPS-LCD 10. FIG. 2 is a top view showing an electrode array of a conventional two-domain IPS-LCD 20. Two transverse-extending gate lines 12 and two lengthwise-extending data lines 14 define a pixel area 11, in which a TFT device 15, a comb-shaped pixel electrode 16 and a herringbone-shaped common electrode 18 are formed. Each of the teeth 16*a* of the pixel electrode 16 and the bones 18*b* of the common electrode 18 has a chevron-shaped profile and the inclined portion of the chevron-shaped profile is parallel to the adjacent electrode. When an outer voltage is applied to the IPS-LCD 20, the directions of the electric fields at two sides of the center wiring 18*a* are different to make a part of LC molecules rotate in a counterclockwise direction and another part of LC molecules rotate in a clockwise direction. Therefore, the center wiring 18*a* demarcates the pixel area 11 as an upper single-domain area 11*a* and a lower single-domain area 11*b*. Within each single-domain area 11*a* or 11*b*, the inclined portion of the tooth 16*a* is parallel to the inclined portion of the bone 18*b* and thus a uniform in-plane electric field is generated therebetween. This still encounters the problems of high driving voltage and low aperture ratio.

FIG. 3 is a top view showing the rotation of LC molecules in a uniform electric field of a conventional multi-domain IPS-LCD 30. In a pixel area, three pixel electrodes 24*a*, 24*b* and 24*c* are disposed in the intervals of four common electrodes 26*a*, 26*b*, 26*c* and 26*d* between two adjacent data lines 22. Each of the data lines 22, the pixel electrodes 24 and the common electrodes 26 has a specific profile that is formed by lengthwise connecting at least two “<” shapes. In addition, an orientation layer is formed to cover the pixel area and rubbed in a direction shown as arrow A. When no outer voltage or an outer voltage below the threshold voltage is applied to the IPS-LCD 30, LC molecules 28 are aligned along the direction shown as arrow A.

Hereinafter, a single-domain area between the pixel electrode 24*b* and the common electrode 26*b* is an example of how the first LC molecule 28I adjacent to the tip of the “<” shape and the second LC molecule 28II far away from the tip of the “<” shape rotate. When an outer voltage is applied to generate an in-plane electric field that is lager than a threshold electric field, the directors of the first LC molecule 28I and the second LC molecule 28II rotate uniformly to become the LC molecules 28I' and 28II', respectively. Since the rotating angles, depending on the degree of the applied voltage, of the first LC molecule 28I and the second LC molecule 28II are the same, the rotated LC molecules 28I' and 28II' are parallel to each other. That is, the first LC molecule 28I and the second LC molecule 28II simultaneously start rotating, simultaneously stop rotating, and have the same rotating angle. There is no rotating moment generated between the first LC molecule 28I and the second LC molecule 28II, and no elastic distorted energy existed between the first LC molecule 28I and the second LC molecule 28II. Further, if the applied voltage is smaller than the threshold electric field, all the LC molecules 28 positioned in the single-domain area cannot rotate because they have the same threshold electric field. This still encounters the problems of high driving voltage and low aperture ratio.

SUMMARY OF THE INVENTION

The present invention is to provide an electrode array of a two-domain IPS-LCD to solve the problem caused by the prior art.

In the IPS-LCD, a plurality of lengthwise-extending common electrodes is formed in each pixel area, and each common electrode has a curved profile. A plurality of lengthwise-extending pixel electrodes are formed in each pixel area, and each pixel electrode has a curved profile. The pixel electrodes are disposed it the intervals of the common electrodes, and two adjacent pixel electrode and common electrode form a sub-pixel area. Liquid crystal molecules are positioned within each sub-pixel area where is defined as at least two single-domain areas according to the rotating direction of the liquid crystal molecules. The two adjacent pixel electrode and common electrode within each sub-pixel area are not parallel to each other, thus a gradient in-plane electric field is generated therebetween.

Accordingly, it is a principal object of the invention to provide an IPS-LCD with a lower driving voltage without reducing aperture ratio.

Yet another object of the invention is to provide an IPS-LCD with a gradient electric field within a single-domain area.

It is a further object of the invention to provide an IPS-LCD to decrease the turn-on time.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
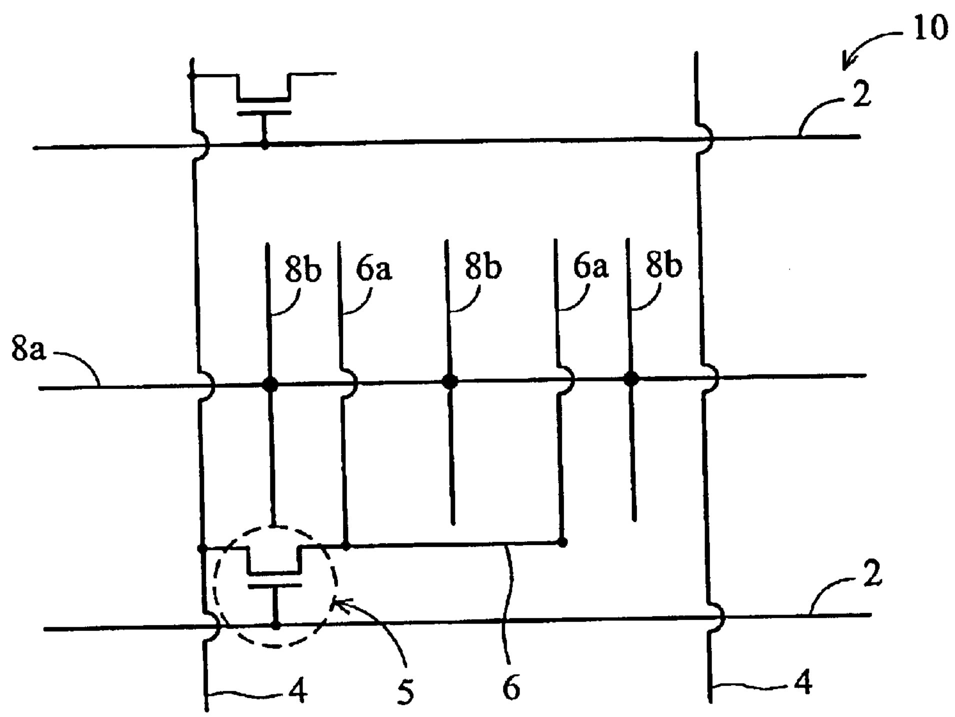
FIG. 1 is a top view showing an electrode array of a conventional single-domain IPS-LCD.
Figure 2:
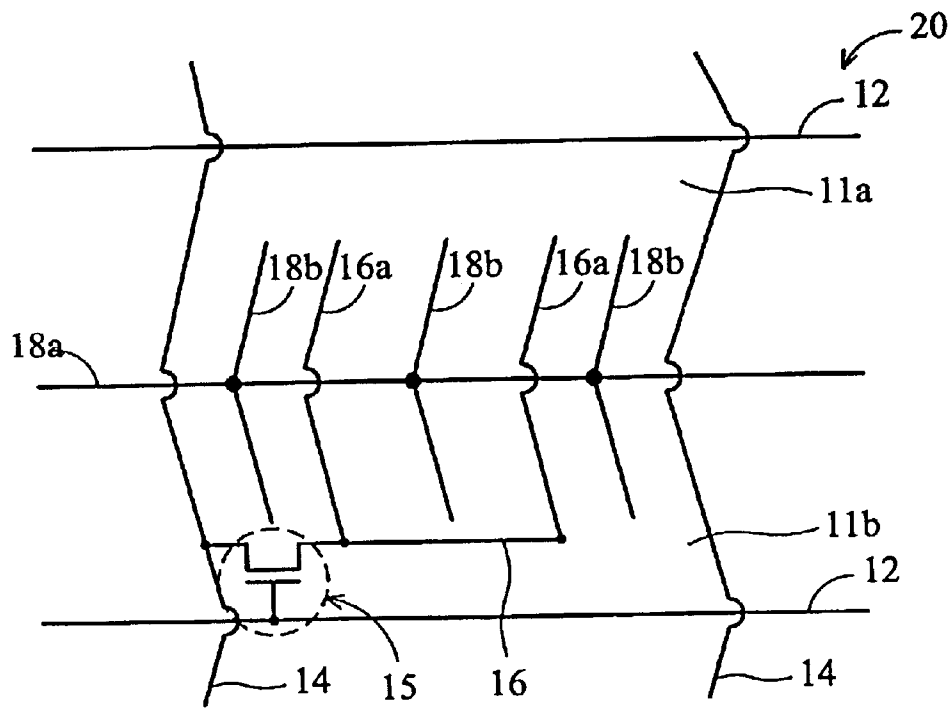
FIG. 2 is a top view showing an electrode array of a conventional two-domain IPS-LCD.

The present invention provides an electrode array of a two-domain IPS-LCD to generate a gradient electric field between a pixel electrode and a common electrode by modifying the profile and width of the pixel electrode and the common electrode, such as fabricating a specific profile with at least a "<" shape, increasing the line width near the tip of the "<" shape, and adjusting the distance between adjacent tips of the "<" shape. This forms a larger distance and a smaller distance between the adjacent pixel electrode and the common electrode within a single-domain area, and thus a gradient electric field is generated therebetween after applying an outer voltage. The gradient electric field indicates that the differential of the strength (including direction) of the in-plane electric field at each point to the corresponding planar area is not zero. Accordingly, a larger electric field is generated in a first area where the distance between the adjacent pixel electrode and common electrode is smaller, and a smaller electric field is generated in a second area where the distance between the adjacent pixel electrode and common electrode is larger. Since the effect of a threshold electric field is defined in the first area where the largest electric field is generated, a first LC molecule positioned in the first area starts to rotate when the applied voltage is to generate a field larger than the threshold electric field. Also, as time is increasing, the rotating angle of the first LC molecule is increasing to convey elastic distorted energy to adjacent LC molecules positioned far away from the first area and drive the adjacent LC molecules to rotate. Furthermore, the angle $\theta$ between the alignment direction of the LC molecule and the in-plane electric field is not uniform. When the LC molecule is composed of a positive dielectric anisotropy material, the rotating range of angle $\theta$ is about 0°~89°(from 0°~60° or up to 89°, preferably about 89°~60°). When the LC molecule is composed of a negative dielectric anisotropy material, the LC molecule initial alignment is at $\theta$=90°, and the rotating range of angle $\theta$ is about 90°~179°(from 90°~150° or up to 179°). Moreover, compared with the conventional design of a uniform electric field in an IPS-LCD, the LC molecules positioned far away from the first area has a lower effective threshold electric field in the present invention. Therefore, the two-domain IPS-LCD of the present invention has a lower driving voltage without decreasing the aperture ratio.

Hereinafter, two preferred electrode arrays are shown to describe how to modify the profile of the pixel electrode and the common electrode to achieve the gradient electric field within a single-domain area. No matter how many curves are fabricated on the sidewall of the electrode within a sub pixel area, the smallest distance W between a pixel electrode and a common electrode in one single-domain area is the same with that in another single-domain area. Also, the smallest distance W in one single-domain area of the sub-pixel area is the same with that in one single-domain area of the adjacent sub-pixel area.

[First Embodiment]

Figure 4:
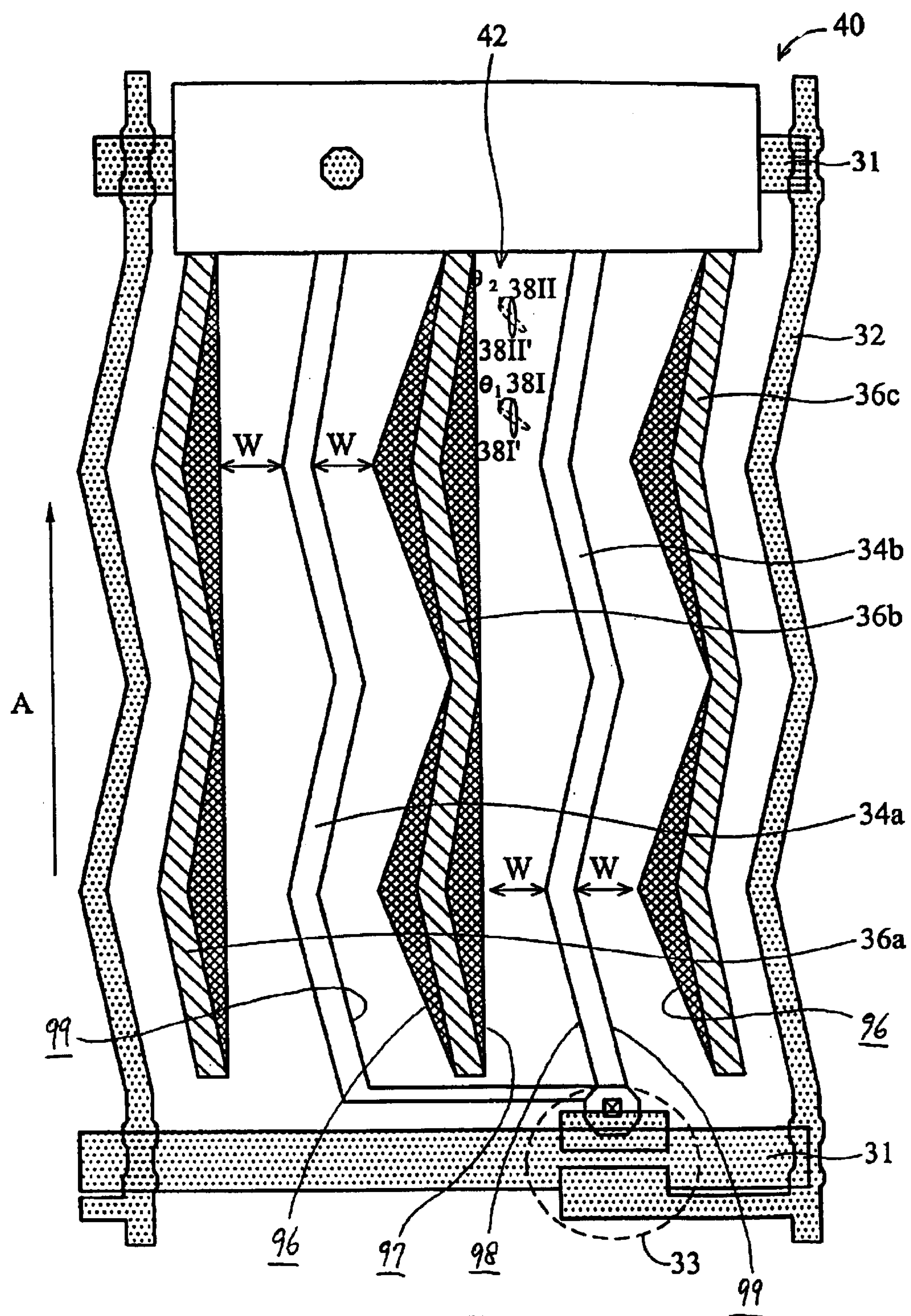
FIG. 4 is a top view showing a electrode array of a two-domain IPS-LCD according to the first embodiment of the present invention.

FIG. 4 is a top view showing a electrode array of a two-domain IPS-LCD 40 according to the first embodiment of the present invention. Two transverse-extending gate lines 31 and two lengthwise-extending data lines 32 define a pixel area 42, in which a TFT device 33, two pixel electrodes 34*a* and 34*b* and three common electrodes 36*a*, 36*b* and 36*c* are formed. The pixel electrodes 34*a* and 34*b* are formed in the intervals of the common electrodes 36*a*, 36*b* and 36*c*. Each of the data line 32, the pixel electrodes 34*a* and 34*b* and the common electrodes 36*a*, 36*b* and 36*c* has the same profile that is formed by lengthwise connecting at least two "<" shape. Also, an orientation layer is formed to cover the pixel area 42 and rubbed along a direction as shown by arrow A. Before applying an outer voltage to the IPS-LCD 40, LC molecules 38 are aligned along the direction shown by arrow A. Furthermore, the light leak area between the data line 32 and the common electrode 36 is covered by a black matrix formed on a color filter substrate.

Figure 3:
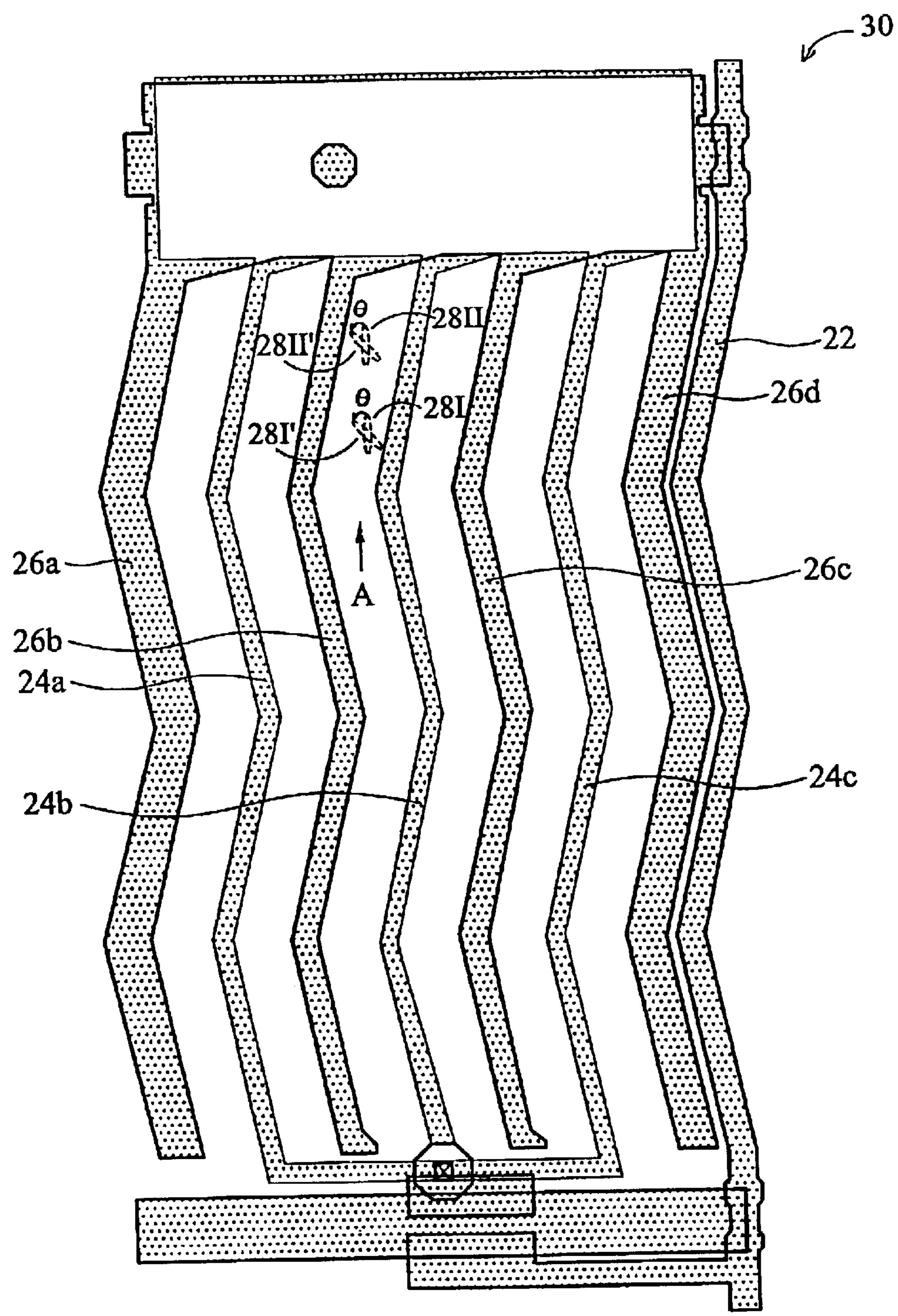
FIG. 3 is a top view showing the rotation of LC molecules in a uniform electric field of a conventional multi-domain IPS-LCD.

Compared with the conventional common electrodes 26*a*, 26*b* and 26*c* having the same profile shown in FIG. 3, the three common electrodes 36*a*, 36*b* and 36*c* have different profiles. The first common electrode 36*a* is modified by widening the indentation of the <-shaped profile of the common electrode 26*a*, thus a smallest distance W is formed between the planarization of the first common electrode 36*a* and the tip of the <-shaped pixel electrode 34*a*. The second common electrode 36*b* is modified by widening the indentation of the <-shaped profile of the common electrode 26*b* and widening the protrusion of the <-shaped profile of the common electrode 26*b*. Thus, a smallest distance W is formed between the indentation of the <-shaped pixel electrode 34*a* and the protrusion of the second common electrode 36*b*. Also, a smallest distance W is formed between the protrusion of the <-shaped pixel electrode 34*b* and the planarization of the second common electrode 36*b*. The third common electrode 36*c* is modified by widening the protrusion of the <-shaped profile of the common electrode 26*c*, thus a smallest distance W is formed between the indentation of the pixel electrode 34*b* and the protrusion of the third common electrode 36*c*.

Hereinafter, a single-domain area between the pixel electrode 34*b* and the second common electrode 36*b* is an example to explain the rotation of the first LC molecule 38I positioned in a first area where the smallest distance W is formed and the second LC molecule 38II positioned in a second area that is far away from the first area. After an outer voltage is applied to the IPS-LCD 40, the highest electric field is generated at the tip of the <-shaped pixel electrode 34*b*, and the lowest electric field is generated at the top or bottom of the <-shaped pixel electrode 34*b*. This forms a gradient electric field between the pixel electrode 34*b* and the common electrode 36*b*. When the applied voltage is increased to generate an electric field larger than the threshold electric field, the first LC molecule 381 in the first area starts to rotate, but the second LC molecule 38II still keeps in a static state because the local electric field in the second area is low. As the driving time is increasing, the rotating angle $\theta_1$ of the first LC molecule 38I is increasing to convey elastic distorted energy to the second LC molecule 38II. In the meanwhile, the combination of the elastic distorted energy and the local electric field can drive the second LC molecule 38II to rotate, wherein the rotation angle $\theta_2$ of the second LC molecule 38II is smaller than the rotating angle $\theta_1$.

In a condition of generating a gradient electric field within a single-domain area, the first LC molecule 38I and the second LC molecule 38II do not simultaneously start rotating, nor have the same rotating angle. A rotating moment is generated between the first LC molecule 38I and the second LC molecule 38II to provide elastic distorted energy existed to rotate the second LC molecule 38II even though the applied voltage is not enough. Thus, the effective threshold electric field of the second LC molecule 38II is smaller than that in a uniform electric field. This achieves a lower driving voltage without decreasing the aperture ratio of the IPS-LCD 40. Also, when a conventional driving voltage is applied to the IPS-LCD 40, the turn-on time is faster than that in the conventional device.

[Second Embodiment]

Figure 5:
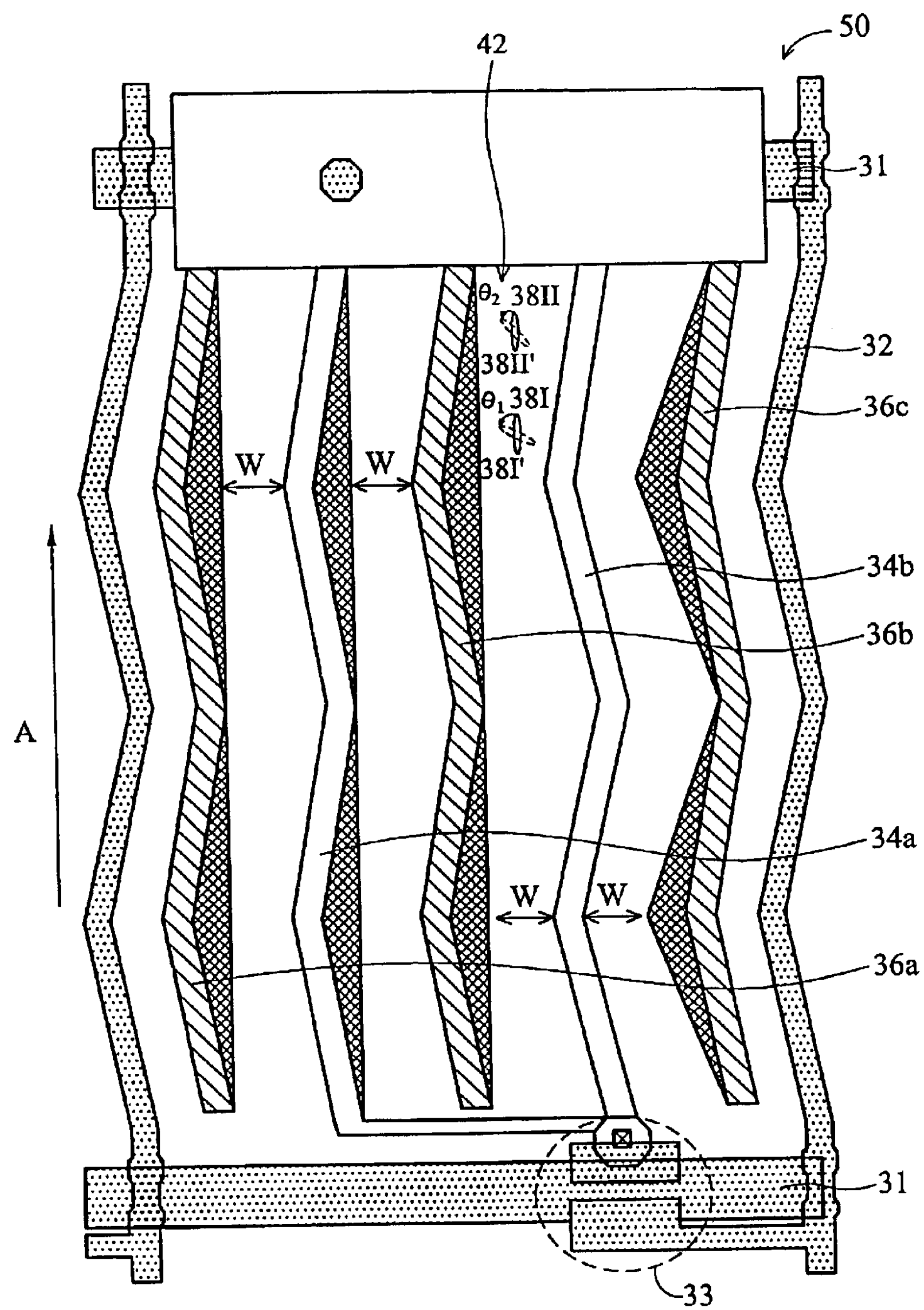
FIG. 5 is a top view showing an electrode array of a two-domain IPS-LCD according to the second embodiment of the present invention.

FIG. 5 is a top view showing an electrode array of a two-domain IPS-LCD 50 according to the second embodiment of the present invention. In the second embodiment, the first pixel electrode 34*a* and the second common electrode 36*b* described in the first embodiment are further modified. Compared with the first embodiment shown in FIG. 4, the first pixel electrode 34*a* is modified by widening the indentation of the <-shaped profile, and the second common electrode 36*b* is modified by removing the widened portion on the protrusion of the <-shaped profile. Thus, the smallest distance W is formed between the planarization of the first pixel electrode 34*a* and the tip of the second common electrode 36*b*.

[Third Embodiment]

With regard to the fabrication of the electrode array shown in FIG. 4, the third embodiment provides three methods of forming tri-layered conductive structure on a TFT substrate. The first method employs a first conductive layer of MoW to form the patterns of the gate line and the common electrode, and then employs a second conductive layer of Mo/Al/Mo to form the patterns of the data line and the pixel electrode. The second method employs a first conductive layer of MoW to form the patterns of the gate line and the common electrode, and then employs a second conductive layer of Mo/Al/Mo to form the pattern of the data line, and finally employs a third conductive layer of ITO to form the pattern of the pixel electrode. The third method employs a first conductive layer of MoW to form the patterns of the gate line and the common electrode with a double-<profile as shown in FIG. 3. Then, a second conductive layer of Mo/Al/Mo is employed to form the patterns of the data line and the pixel electrode with a double-<profile as shown in FIG. 3. Finally, a third conductive layer of ITO is employed to complete the profiles of the common electrode and the pixel electrode shown in FIG. 4, and the third conductive layer is electrically connected to the second conductive layer within each pattern.

It is to be understood that the present invention is not limited to the embodiments described above, but encompasses any and all embodiments within the scope of the following claims.

What is claimed is:

1. An in-plane switching mode liquid crystal display (IPS-LCD), comprising:

a plurality of transverse-extending gate lines and lengthwise-extending data lines to define a plurality of pixel areas arranged in a matrix form;

a plurality of lengthwise-extending common electrodes formed in each pixel area, wherein each common electrode electrode is a first bending structure having at least-one turning point, the first bending structure comprises a first sidewall and a second sidewall, and the first sidewall is not parallel to the second sidewall;

a plurality of lengthwise-extending pixel electrodes formed in each pixel area and disposed in intervals between the common electrodes, wherein each pixel electrode is a second bending structure having at least one turning point, the second bending structure comprises a third sidewall and a fourth sidewall, the third sidewall of at least one second bending structure faces the second sidewall of the first bending structure, the fourth sidewall of at least one second bending structure faces the first sidewall of the first bending structure, and a sub-pixel area is defined between the first and second bending structures; and a plurality of liquid crystal molecules positioned within each sub-pixel area, wherein at least two single-domain areas are defined in the sub-pixel area according to the rotating direction of the liquid crystal molecules;

wherein, a transverse distance between the two adjacent pixel and common electrodes within each sub-pixel area is different along a lengthwise direction of the first and second bending structures, resulting in a non-uniform in-plane electric field gradient in each sub-pixel area.

2. The IPS-LCD according to claim 1, wherein the IPS-LCD is an active matrix-type LCD.

3. The IPS-LCD according to claim 1, wherein the first sidewall has a zigzag profile and the second sidewall has a plane profile.

4. The IPS-LCD according to claim 3, wherein the third sidewall has a zigzig profile and the fourth sidewall has a zigzag profile.

5. The IPS-LCD according to claim 3, wherein the third sidewall has a zigzag profile and the fourth sidewall has a plane profile.

6. The IPS-LCD according to claim 4, wherein the turning point of the first bending structure corresponds to that of the second bending structure.

7. The IPS-LCD according to claim 5, wherein the turning point of the first bending structure corresponds to that of the second bending structure.

8. The IPS-LCD according to claim 1, wherein the rotating angle between the direction of the liquid crystal molecules and the in-plane electric field is not uniform.

9. The IPS-LCD according to claim 1, wherein the liquid crystal molecules are composed of a positive dielectric anisotropy material, and the rotating range of the liquid crystal molecules is from 0°~60° or up to 89°.

10. The IPS-LCD according to claim 9, wherein the liquid crystal molecules are composed of a positive dielectric anisotropy material, and the rotating range of the liquid crystal molecules is from 89°~60°.

11. The IPS-LCD according to claim 1, wherein the liquid crystal molecules are composed of a negative dielectric anisotropy material, and the rotating range of the liquid crystal molecules is from 90°~150° or up to 179°.

12. The IPS-LCD according to claim 11, wherein the liquid crystal molecules are composed of a negative dielectric anisotropy material, and the liquid crystal molecule initial alignment is at $\theta=90°$.

13. An in-plane switching mode liquid crystal display (IPS-LCD), comprising:

a plurality of transverse-extending gate lines and lengthwise-extending data lines to define a plurality of pixel areas arranged in a matrix form;

a plurality of lengthwise-extending common electrodes formed in each pixel area, wherein each common electrode is a first bending structure having at least one turning point, the first bending structure comprises a first sidewall and a second sidewall, and the first sidewall is not parallel to the second sidewall;

a plurality of lengthwise-extending pixel electrodes formed in each pixel area and disposed in intervals between the common electrodes, wherein each pixel electrode is a second bending structure having at least one turning point, the second bending structure comprises a third sidewall and a fourth sidewall, the third sidewall of at least one second bending structure faces the second sidewall of the first bending structure, the fourth sidewall of at least one second bending structure faces the first sidewall of the first bending structure, and a sub-pixel area is defined between the first and second bending structures; and a plurality of liquid crystal molecules positioned within each sub-pixel area, wherein at least two single-domain areas are defined in the sub-pixel area according to the rotating direction of the liquid crystal molecules, wherein a transverse distance between the two adjacent pixel and common electrodes within each sub-pixel area is different along lengthwise direction of the first and second bending structures, resulting in a non-uniform in-plane electric field gradient in each sub-pixel area, and wherein a larger electric field is generated on a first area where the transverse distance between the adjacent pixel and common electrodes is smaller, and a smaller electric field is generated on a second area where the transverse distance between the adjacent pixel and common electrodes is larger.

14. The IPS-LCD according to claim 13, wherein the first sidewall has a continuous <-shaped profile and the second sidewall has a plane profile.

15. The IPS-LCD according to claim 14, wherein the third sidewall has a continuous <-shaped profile and the fourth sidewall has a continuous <-shaped profile.

16. The IPS-LCD according to claim 14, wherein the third sidewall has a continuous <-shaped profile and the fourth sidewall has a plane profile.

17. The IPS-LCD according to claim 15, wherein the turning point of the first bending structure corresponds to that of the second bending structure.

18. The IPS-LCD according to claim 16, wherein the turning point of the first bending structure corresponds to that of the second bending structure.

19. The IPS-LCD according to claim 13, wherein the liquid crystal molecules are composed of a positive dielectric anisotropy material, and the rotating range of the liquid crystal molecules is from 0°~60° or up to 89°.

20. The IPS-LCD according to claim 13, wherein the liquid crystal molecules are composed of a negative dielectric anisotropy material, and the rotating range of the liquid crystal molecules is from 90°~150° or up to 179°.

* * * * *